United States Patent [19]

Partain et al.

[11] Patent Number: 5,080,504
[45] Date of Patent: Jan. 14, 1992

[54] OPTICAL SWITCHING APPARATUS AND METHOD

[75] Inventors: Larry D. Partain, San Jose; Gary F. Virshup, Cupertino; Jocelyn C. Schultz, Oakland; Maria L. Ristow, Los Gatos, all of Calif.

[73] Assignee: Varian Associates, Inc., Palo Alto, Calif.

[21] Appl. No.: 546,205

[22] Filed: Jun. 28, 1990

[51] Int. Cl.$^5$ .............................................. G02B 6/26
[52] U.S. Cl. ........................................ 385/17; 385/4; 385/5; 385/16
[58] Field of Search ........................... 350/96.13, 96.20

[56] References Cited

U.S. PATENT DOCUMENTS 4,773,721  9/1988  Erman et al. .................... 350/96.13

OTHER PUBLICATIONS

Miller et al., "Optical; bistability due to increasing absorption", Optics Letters, vol. 9, 162 (1984).
Lee et al., "Room-Temperature Optical Nonlinearities in GaAs", Phys. Rev. Lett. 57, 2446 (1986).
Dias et al., "Fiber-Optic crossbar switch with broadcast capability", Optical Engineering 27, 955 (1988).
Simes et al., "Electrically tunable Fabry-Perot mirror using multiple quantum well index modulation", Appl. Phys. Lett. 53, 637 (1988).
Lewis et al., "The Growth of Magnesium-Doped GaAs By The OM-VPE Process", J. Electron. Mater. 12, 507 (1983).
Partain et al., "26.1% solar cell efficiency for Ge mechanically stacked under GaAs", J. Appl. Phys. 62, 3010 (1987).
Hamaker et al., "26% efficient magnesium-doped AlGaAs/GaAs solar concentrator cells", Appl. Phys. Lett. 47, 762 (1985).
Neuberger, III-V Semiconducting Compounds, Handbook of Electronic Materials, vol. 2 (Plenum, N.Y. 1971), pp. 53, 98.
Sze, *Physics of Semiconductor* Devices, (Wiley, N.Y., 1969), pp. 57, 58.
Hsu et al., "Multiple quantum well spatial light modulators for optical processing applications", Optical Engineering 27, 372 (1988).
Fraas et al., "GaSb booster cells for over 30% efficient solar-cell stacks", J. Appl. Phys. 66, 3866 (1989).
Streible et al., "Digital Optics", IEEE 77, 1954 (1989).
Bailey et al., "Temperature-dependent characteristics of GaAs/AlGaAs multiple-quantum-well optical modulators", J. Appl. Phys. 66, 3445 (1989).
Tomita et al., "F:1 ON-OFF contrast InGaAs/InP multiple quantum well Fabry-Perot etalon modulator", Appl. Phys. Lett. 55, 1817 (1989).
Lee et al., "Electrodispersive multiple quantum well modulator", Appl. Phys. Lett, 53, 1684 (1988).
Miller et al., "Novel Hybrid optically bistable switch: The quantum well self-electro-optic effect device", Appl. Phys. lett. 45, 13 (1984).
Wood et al., "100 ps Waveguide Multiple Quantum Well (MQW) Optical Modulator With 10:1 On/Off Ratio", Electronics Lett. 21, 693 (1985).
Boyd et al., "Multiple quantum well reflection modulator", Appl. Phys. Lett. 50, 1119 (1987).
Miller et al., "Integrated quantum well self-electro-optic effect device: 2X2 array of optically bistable switches", Appl. Phys. Lett. 49, 821 (1986).
Ideda, "Laser Diode Switch", Electron, Lett. 17, 899 (1981).

*Primary Examiner*—John D. Lee
*Assistant Examiner*—Phan T. Heartney
*Attorney, Agent, or Firm*—Phan T. Heartney; Peter J. Sgarbossa

OTHER PUBLICATIONS

[57] ABSTRACT

An apparatus and method for switching unpolarized light are provided. The apparatus includes GaInAs/GaAs optical switching devices which can be fabricated using conventional processes on a single wafer in matrix arrangement to provide an n×m cross bar switch. Switching is accomplished by shifting the band gap of the GaInAs material of a device using electrical or optical power to heat the material. Each switching device may comprise two-polarity (n/p) or single polarity (n or p) semiconductor materials.

23 Claims, 5 Drawing Sheets (List continued on next page.)

Walker et al., "Measurment of Semiconductor Laser Amplifier Noise Figure in Coherent Optical Transmission System", Electron, Lett. 25, 1681 (1989).

Granestrand et al., "Integrated Optics 4×4 Switch Matrix With Digital Optical Switches", Electron, Lett. 26, 4 (1990).

Efron et al., "The silicon liquid-crystal light valve", J. Appl. Phys. 57, 1356 (1985).

Abdulhalim et al., "High-speed analog spatial light modulator using a hydrogenated amorphous silicon photosensor and an electroclinic liquid crystal", Appl. Phys. Lett. 55, 1603 (1989).

Goodwin et al., "8×8 Element hybridised PLZT/Silicon Spatial Light Modulator Array", Electron, Lett. 25, 1260 (1989).

Goosen et al., "Observation of room-temperature blue shift and bistability in a strained InGaAs-GaAs <111> self-electro-optic effect device", Appl. Phys. Lett. 56, 715 (1990).

Carslaw et al., *Conduction of Heat in Solids*, Oxford, Oxford, 1980) pp. 2, 9 and 92.

Whitehead et al., "Low-Voltage Multiple Quantum Well Reflection Modulator with On:Off Ration >100:1", Electron, Lett. 25, 984 (1989)

Sharfin et al., "Femtojoule Optical switching in nonlinear semiconductor laser amplifiers", Appl. Phys. Lett. 48, 321 (1986).

OPTICAL SWITCHING APPARATUS AND METHOD

BACKGROUND OF THE INVENTION

This invention relates to an apparatus and method for controlling the transmission of light of a selected wavelength through a material having a thermally sensitive coefficient of optical absorption. More particularly, this invention relates to optical switching devices in which the transmissivity of the device for a selected wavelength of light is switched from a more transmissive state to a less transmissive state (or from a less transmissive state to a more transmissive state) by application of one or more control signals to the device to activate a thermal switching mechanism. The control signals are independent of the light being switched.

Switching is a basic function in the developing fields of optical signal processing and communications. As these fields have developed, and as optical signal processing and communication systems have become more complex and more widely used, a need has arisen for switching devices that are versatile, efficient and easily fabricated.

One proposed form of an optical switch is the generalized cross bar switch. Such a switch comprises, in theory, a matrix of optical switching devices each of which can be independently controlled to switch a separate light signal. An optical cross bar switch has many potential uses. In fiber optic communications, for example, an optical cross bar switch can be used to provide a link between one bundle of optical fibers and another. In optical signal computing, an optical cross bar switch can be used to interconnect optical computing elements.

An optical cross bar switch having a high density of switching devices would be particularly useful in performing massively parallel processing operations. For example, a high density cross bar switch can be used as a spatial light modulator for parallel processing of two-dimensional data-like images. Preferably, the modulator would be implemented such that the data signal impinges orthogonally on the modulator surface. This would be an improvement over known "waveguide" structures which require light signals to travel parallel to the surface of the structure.

The above-mentioned "waveguide" structures are but one of several technologies that have been or are being investigated in connection with optical switching. Several such technologies are based on optical properties of semiconductor materials. For example, semiconductor structures known as multiple quantum well (MQW) structures, which include devices known as self-electro-optic devices (SEEDs), have been investigated as a potential technology for implementing optical switching devices. Semiconductor laser amplifiers, many of which fall into the "waveguide" category in that they accept light parallel to the semiconductor wafer, have also been considered as potential switching devices. These known semiconductor technologies suffer various drawbacks when used to implement optical switching devices, including in different cases one or more of the following: low on/off contrast ratios, high power or high biasing voltage requirements, high noise levels and technological limits on the growth of the structures.

Several different non-semiconductor technologies also have been investigated as possible solutions for developing optical switching devices. These technologies include switches based on liquid crystals, lead lanthanum, zirconiuim titanite (also known as PLZT), and $LiNbO_3$. Such switches, however, also suffer various drawbacks. Many require polarized light and have high insertion losses. High voltage requirements and low on/off contrast ratios are also problems in many cases. In addition, techniques for fabricating such devices in high densities are not readily available, in contrast to the high density, integrated circuit processing techniques that are readily available for semiconductor-based devices.

To illustrate some of the principles employed in the prior art to achieve optical switching, and to more particularly illustrate some of the problems encountered by prior art techniques, a discussion follows of two such techniques.

It is known in the prior art that a semiconductor material will absorb incident photons having energies equal to or greater than the band gap energy of the material, and will transmit incident photons having energies less than the band gap energy of the material. The degree to which a semiconductor material will absorb an incident light signal of a particular photon energy (or wavelength) is characterized by an absorption coefficient. Generally, the absorption coefficient of a semiconductor material varies non-linearly over the photon energy spectrum, with a particularly high rate of change near the edge of the semiconductor band gap.

It is also known that the band gap energy of a semiconductor material can be caused to shift by exciting the material. For example, it is known that by heating the semiconductor material its band gap energy can be caused to decrease. On the other hand, it is known that population inversion excitation (for laser-type amplification) can be used to cause the band gap energy to shift in the opposite direction.

These properties of semiconductors have been used in at least one known instance to develop an experimental structure which can be caused to switch between a transmissive state and an absorptive state depending on the power of an incident light signal. This structure is described in D. A. B. Miller, A. C. Gossard and W. Wiegmann, "Optical bistability due to increasing absorption", Optics Letters, Vol. 9, No. 5, May 1984, pp. 162-4.

According to the Miller et al. article, switching results in the described structure because, at photon energies near the band gap energy of the semiconductor material of the structure, absorption increases as a non-linear function of the excitement of the material. Any absorption causes the temperature of the semiconductor material to increase. As a result of the increase in temperature, the band gap energy of the semiconductor material decreases and the absorption increases, thus producing a regenerative feedback mechanism. If the power of the incident light signal is increased to a certain threshold level, theoretically this regenerative feedback mechanism causes the optical absorption to increase dramatically and switches the structure into a low transmission state.

This switching methodology, however, suffers several drawbacks. For one, the switched light signal's amplitude controls switching. Therefore, switching control is not independent of the light being switched—complicating and restricting applications. More-over, the switching mechanism is highly sensitive to the wavelength of the switched light signal.

The non-linear absorption characteristics of semiconductors also have been investigated using a laser beam of variable power to excite (population invert) a semiconductor material while a second light signal is incident on the material. See Y. H. Lee et al., "Room-Temperature Optical Nonlinearities in GaAs," Phys. Rev. Letters 57, 2446 (1986). As a possible method for optical switching, however, this laser amplifier excitation technique described in the article suffers the drawbacks of high noise generation and of requiring a high power input density to switch. Furthermore, the laser amplifier switching mechanism is not thermal.

In view of the foregoing, it would be desirable to be able to provide an optical switching device that can be optically controlled in a manner that does not depend on the amplitude or other properties of the light signal being switched; that can be electrically controlled at low voltage; that is not particularly sensitive to the wavelength of the light being switched; that can achieve a high on/off contrast ratio and low insertion loss; that has low noise; and that can be manufactured easily using conventional integrated circuit processing techniques.

It would also be desirable to be able to provide an optical switching device that can be fabricated as part of a high density matrix of such devices to form an optical cross bar switch for use in applications such as fiber optic communication and optical signal processing.

SUMMARY OF THE INVENTION

It is an object of this invention to provide a versatile and efficient optical switching apparatus and method incorporating a thermal switching mechanism that can be controlled by either a low power density light signal or a low voltage electrical signal, or both, in a manner that is independent of the properties (such as light amplitude) of the light signal being switched.

It is a further object of this invention to provide an optical cross bar switch including a matrix of individual optical switching devices for selectively switching a plurality of concurrent light signals.

It is another object of this invention to provide an optical switching apparatus and method that can be implemented using conventional high density integrated circuit processing techniques.

In accordance with this invention, there is provided a detailed description of a $Ga_{0.8}In_{0.2}As/GaAs$ optical switching device for unpolarized 1.08 μm light. In a first described embodiment, the device comprises p- and n-type $Ga_{0.8}In_{0.2}As$ and $Al_xGa_{1-x-y}In_yAs$ layers grown on a low doped GaAs substrate, and is fabricated using conventional high density, integrated circuit processing techniques. Switching is accomplished by shifting the band gap of the $Ga_{0.8}In_{0.2}As$ material to longer wavelengths using electrical or optical power to heat the material. The gallium arsenide substrate is low doped to be transparent below its band gap energy and at the selected wavelength of the switch. This provides a robust foundation for the switch that eliminates the need for selective removal of the substrate at each switch location.

Also described is an optical cross bar switch, in which a matrix of optical switch devices are fabricated on a single semiconductor wafer, each separated from the others by a trench etch (or pedestal) that provides thermal and electrical isolation between the devices and the depth (or height) of which can be varied to obtain a desired combination of switching speed and input power.

An alternative optical switch embodiment is described in which the semiconductor layers of the device structure are all of the same polarity, either all n-type or all p-type, thereby eliminating the possibility of undesirable optical noise being generated by a pn junction.

Another alternative embodiment is a low doped indium phosphide substrate and gallium indium arsenide phosphide active switching layer.

A third alternative switching embodiment has an active layer that is a multiple quantum well whose exciton absorption peaks can be thermally shifted to either increase or decrease the absorption coefficient at a selected light wavelength. This thermal switching is independently controlled with heat supplied either by light at a different wavelength or by an electrical voltage applied to the switch.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Applicants have discovered a novel method for switching optical signals. This method is based on the previously described property of semiconductors that the relatively sharp band gap edge of a semiconductor material (or the exciton resonant absorption peaks of a multiple quantum well) can be shifted to different wavelengths by heating the material. Applicants have further discovered that a semiconductor optical switch employing this method can be easily fabricated using conventional integrated circuit processes to provide effective, thermally activated switching.

Applicants believe that the method of the present invention is not limited to semiconductor-based devices; rather, applicants believe that the method of the present invention may be implemented in a device using any material as may be found to be suitable. Applicants prefer semiconductor-based embodiments of the invention because, among other reasons, applicants have found that such embodiments can be made easily using conventional processing techniques.

Figure 1:
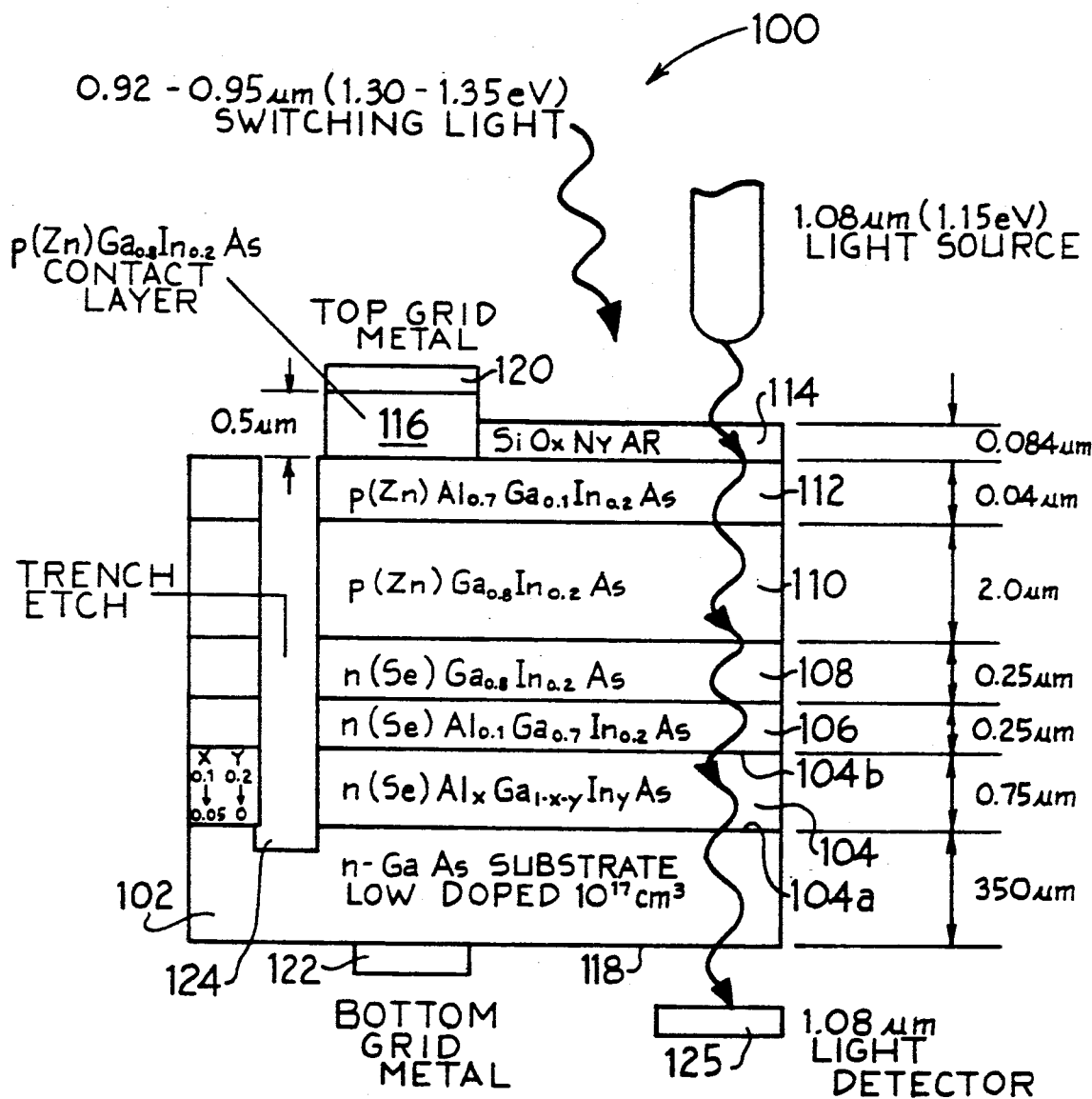
FIG. 1 is cross-sectional view diagram of a first embodiment of an optical switch implemented in accordance with the principles of the invention.

For example, FIG. 1 illustrates a semiconductor-based optical switch 100 that operates in accordance with the principles of this invention. Applicants describe hereafter how this embodiment, which applicants calculate is capable of microsecond switching speeds using thermally activated switching, was fabricated easily using conventional processing techniques.

Switch 100 was fabricated on a substrate 102 comprising low doped n-type GaAs, oriented 2° toward (110) from the (100) plane. Substrate 102 was low doped with silicon to make the substrate transparent to photon wavelengths longer than the 0.88 μm band edge of GaAs. Substrate 102 was chosen to have a depth of 350 μm and a silicon dopant concentration of $3-4 \times 10^{17} cm^{-3}$.

Conventional atmospheric organometallic vapor phase epitaxy (OMVPE) was used to grow the switch structure on substrate 102. Trimethylgallium, trimethylaluminum and trimethylindium were used as the column III sources and arsine as the column V source. Hydrogen selenide and diethylzinc were used to provide n-type and p-type doping, respectively. The growth was carried out at a substrate temperature of 640° C. and at a rate of 4 μm/hr.

The various layers of switch 100 were grown as follows. First, a layer 104 of n-type $Al_xGa_{1-x-y}In_yAs$, where x, y and $1-x-y$ represent respectively the fractions of aluminum, gallium and indium atoms on Column III sites in the material, was grown on top of substrate 102 to accommodate lattice mismatch.

Layer 104 has a depth of 0.75 μm and a selenium dopant concentration of $5 \times 10^{18} cm^{-3}$. At the lower boundary 104a of layer 104, x and y have values of 0.05 and 0.0, respectively, such that the lattice constant of layer 104 at lower boundary 104a is nearly identical to that of substrate 102. The relative concentrations of aluminum, gallium and indium were linearly varied as layer 104 was grown to provide a graded change in the lattice constant of layer 104. At upper boundary 104b of layer 104, the values of x and y are 0.1 and 0.2, respectively.

The concentrations of aluminum, gallium and indium are then held constant for a period of time to create layer 106, which caps layer 104 and comprises n-type $Al_{0.1}Ga_{0.7}In_{0.2}As$ grown to a depth of 0.25 μm. Aluminum is included in layers 104 and 106 to make the layers transparent to 1.08 μm light.

Active layers 108 and 110 are next grown. Active layers 108 and 110 are both comprised of $Ga_{0.8}In_{0.2}As$, layer 108 being 0.25 μm thick and n-type, with a selenium dopant concentration of $2 \times 10^{18} cm^{-3}$, and layer 110 being 2.0 μm thick and p-type, with a zinc dopant concentration of $5 \times 10^{17} cm^{-3}$. Active layers 108 and 110 thus comprise respectively the base and emitter layers of a diode. The composition of active layers 108 and 110 is chosen to provide a band gap edge (e.g., 1.06 μm) at room temperature slightly greater than the photon energy of the light signal (1.08 μm) being switched.

Active layer 110 is covered by a 0.04 μm thick window layer 112 comprising p-type $Al_{0.7}Ga_{0.1}In_{0.2}As$, with a zinc dopant concentration of $5 \times 10^{18} cm^{-3}$, on top of which is formed a light receiving surface 114 and an electrical contact layer 116. Light receiving surface 114 comprises an anti-reflective coating, such as a silicon oxygen-nitride compound, having a refractive index of $n_x = 1.79$, and a thickness of 0.084 μm. Preferably, switch 100 is also provided with an anti-reflective coating 118 on the light emitting portions of the lower surface of substrate 102. Top and bottom metallization layers 120 and 122 are provided for making electrical contact to switch 100. Conventional photolithography, etching and ohmic contact metallization can be used to fabricate switch 100.

Applicants recognized after fabricating switch 100 that window layer 112, which may have an undesirable reflective (and thus intensifying) effect on minority carriers generated in active regions 108 and 110, is unnecessary for thermal switching and may be eliminated. The mirroring effect of the layer is undesirable because of the possibility that laser amplifier activity might be initiated in switch 100. Such laser activity generates undesirable noise and may cause a shift in the optical absorption that interferes with thermal switching. Accordingly, in a preferred embodiment window layer 112 would be removed.

The thermally activated switching mechanism of switch 100 operates as follows. The 1.08 μm light signal to be switched is directed orthogonally at light receiving surface 114 of switch 100 as shown. When switch 100 is in an inactivated state (i.e., no switching signal is applied), switch 100 will transmit a percentage of the incident 1.08 μm light to detector 125. The percentage is determined by the absorption coefficients and thicknesses of the various layers through which the light must pass.

Figure 3:
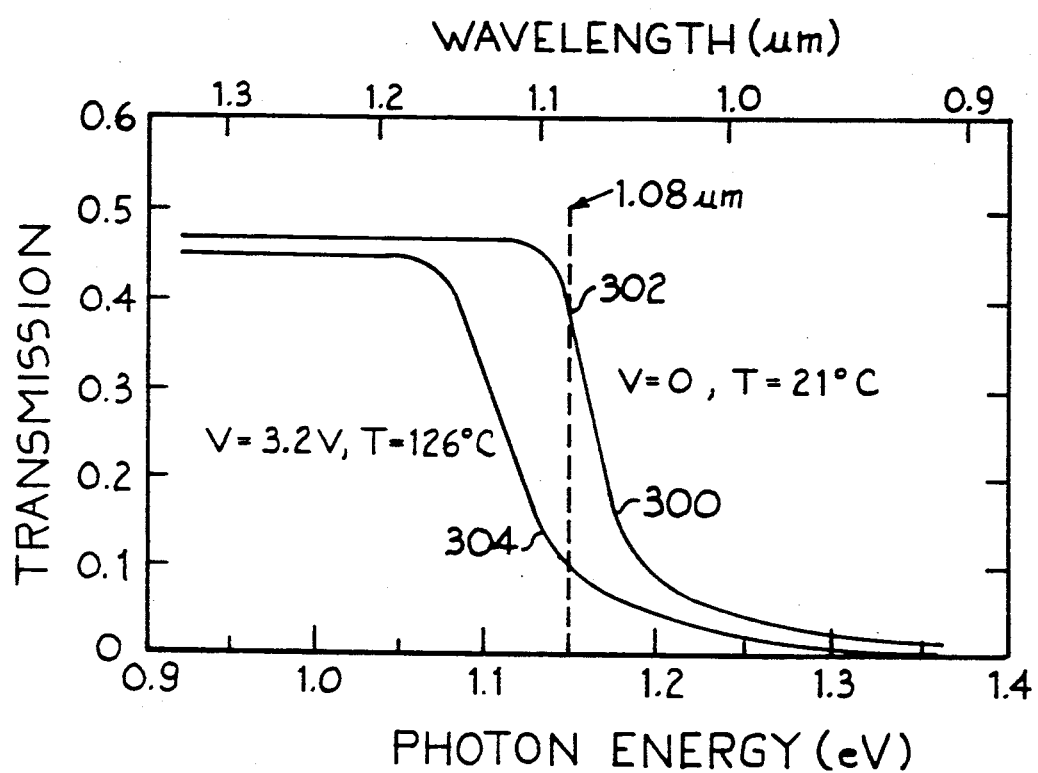
FIG. 3 is a graph showing transmissivity of the optical switch embodiment of FIG. 1 at different wavelengths and with and without application of a 3.2 volt electrical switching signal.

The absorption coefficients of the various layers of switch 100 are functions of the wavelength of the incident light and the temperature of the semiconductor material, as was generally discussed in the background section, such that the transmissivity of switch 100 is therefore also a function of the wavelength of the incident light signal and the temperature of the switch. The transmissivity of switch 100 for unpolarized light, when in an inactivated state, is shown in FIG. 3 by V=0 volts curve 300. As can be seen from this curve, switch 100 has a transmissivity of approximately 0.42 for 1.08 μm light at room temperature, which is the temperature at which the switch is maintained by the substrate and/or other heat sinking material attached to the substrate when the switch is not activated. This is shown by the graph of FIG. 3 at point 302 on the V=0 volts curve 300. The thicknesses of the switch layers can be varied to achieve different transmissivity values (i.e., the upper and lower parts of curve 300 can be shifted up and down).

Switch 100 is activated by applying a voltage to forward bias the diode formed by active layers 108 and 110 such that electrical current flows through switch 100 and heats the p/n junction of the diode. As a result of the heating of active layers 108 and 110, the unpolarized light transmission curve of switch 100 is "expanded" to shift the $Ga_{0.8}In_{0.2}As$ absorption edge from 1.06 μm (at room temperature) to longer wavelengths. This is shown, for example, by curve 304 of FIG. 3, which represents the transmissivity of switch 100 when a forward bias voltage of 3.2 volts is applied (e.g., a positive voltage is applied to top metallization layer 120 while bottom metallization layer 122 is grounded). At this voltage, a current of 3.5 A flows through switch 100. FIG. 3 illustrates that, for 1.08 μm light, the transmissivity switches from 0.42 to 0.09 for an on/off contrast ratio of 4.7 and an "on" insertion loss of 3.8 db.

The $Ga_{0.8}In_{0.2}As$ absorption coefficient $\alpha$ at 1.08 μm can be estimated from $I/I_0 = \exp(-\alpha h)$ where h is the 2.25 μm switch layer thickness (layers 108 and 110), I is the measured transmission at 1.08 μm, and $I_0$ is the measured transmission at wavelengths beyond the band edge (>1.2 μm). Using data from FIG. 3, this equation gives an "off" value of 7,250 cm$^{-1}$ and an "on" value of 593 cm$^{-1}$, for an on:off change of 6,660 cm$^{-1}$. This 6,660 cm$^{-1}$ change is sufficient to produce a 1,000:1 on:off contrast ratio with a 10.4 μm thick $Ga_{0.8}In_{0.2}As$ switching layer that can be readily grown in a conventional MOCVD run of 4 hours. Such $10^3$ or 30 db on:off performance is desirable in high performance cross bar switches to reduce cross talk and to accommodate a high dynamic range.

As previously stated, the switching is due to a shift in the band gap of the $Ga_{0.8}In_{0.2}As$ layers 108 and 110. This shift is thermally activated. It results from heating of the semiconductor material of layers 108 and 110 caused by the electrical power applied to the device. The band gap shift shown in FIG. 3, which is approximately 0.05 eV (or 0.05 μm), resulted from the application of 11.2W (3.2V@3.5A) of electrical power. The 0.05 eV band gap change corresponds to a calculated temperature rise of 126° C. This calculation is based on an approximation that the band gap temperature coefficient of $Ga_{0.8}In_{0.2}As$ is equal to the $-3.95 \times 10^{-4}$ eV/° C. value of GaAs. The band gap temperature coefficient of GaAs is taken from M. Neuberger in *III-V Semiconductor Compounds, Handbook of Electronic Materials*. Vol. 2 (Plenum, N.Y., 1971), p. 53.

Figure 2:
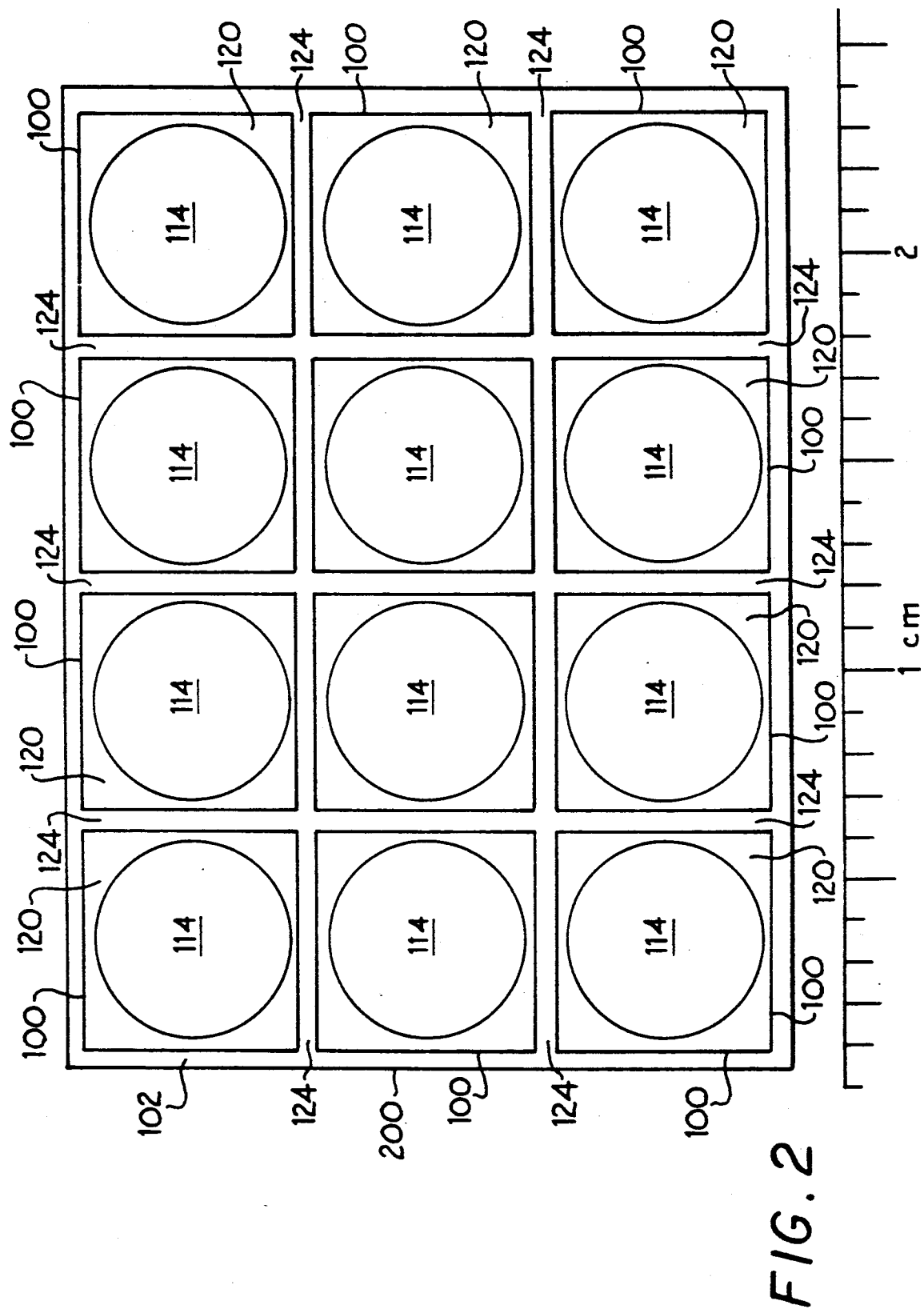
FIG. 2 is a top plan view diagram of an embodiment of a 3×4 optical cross bar switch implemented in accordance with the principles of the invention using optical devices of the type shown in FIG. 1.

The curves shown in FIG. 3 were obtained using a switch device structure 6×6 mm square, with 5 mm diameter circular light receiving and transmitting surfaces on top and bottom, like the devices shown in FIG. 2. The input power density to achieve the switching shown in FIG. 3 can thus be calculated as power/area=11.2 Watts/[0.6 cm]$^2$ or 31.1 W/cm$^2$.

The switch device structure used to obtain FIG. 3 only had an antireflection (AR) coating on its top surface (layer 114 of FIG. 1). However, a measured transmission of over 0.9 has been reported for low doped GaAs substrates with front and rear AR coatings. Hence, thermally actuated optical switch insertion losses below 1 db should be possible. These and other losses must be offset with gain in large cross bar switches.

As an alternative to using electrical power to heat the semiconductor material, optical power may be used, thus allowing for an all optical switch. As shown in FIG. 1, this optical power may be provided, for example, by directing light having wavelengths in the range of 0.92–0.95 μm (photon energies 1.3–135 eV) at light receiving surface 114. An optic fiber may be used as the light source. The wavelength of the switching light signal is chosen such that the switching light energy is absorbed in the $Ga_{0.8}In_{0.2}As$ layers 108 and 110, and not in substrate 102, which has a 0.88 μm band gap edge value and is transparent to all wavelengths greater than that value. Absorption of the switching light by the substrate is avoided to minimize the input power required for switching.

A combination of electrical and optical power may also be used to drive the switch. For example, one of the switching signals, either electrical or optical, can be used to bias the switch to make it more sensitive to small changes in the other switching signal, thus allowing for thresholding.

FIG. 2 illustrates a cross bar switch 200 implemented in accordance with the principles of the present invention using a 3×4 matrix of optical switches of the type illustrated by switch 100. Each switch 100 can be connected on one side to an end of a first optical fiber mounted on light receiving surface 114 and on the other side to the end of a second optical fiber mounted on light transmitting surface 118 (shown in FIG. 1). Cross bar switch 200 was formed on a 5 cm diameter wafer of GaAs using the fabrication process previously described in connection with switch 100. The size of the switch devices (6×6 mm square) was chosen experimentally. Of course, switch devices of greatly reduced size incorporating the present invention can be easily fabricated using conventional processing techniques to provide higher density cross bar switches.

To provide thermal and electrical isolation between devices, and to control the thermal energy required for switching and switching speed, a trench etch 124 is cut between each switch 100 and neighboring switches. Trench etch 124 is illustrated in FIGS. and 2.

Trench etch 124 penetrates into substrate 102. The depth of this penetration, along with any heat sink attached to the bottom of the substrate, can be used to control switching speed and the thermal power required for switching. Generally, the deeper the penetration, the greater the thermal isolation is between devices, and more time is required for a switch to cool and revert from an off state to an on state after switching signal power is removed. On the other hand, less penetration means that a switch will cool faster, but will require more power to heat. Thus there is a performance trade-off between the input power and switching speed characteristics of the switches 100 of cross bar switch 200, which trade-off can be controlled by the manufacturer.

The electrical/optical input power required to obtain a particular temperature rise, and thus a desired shift in the band gap of the switch of the present invention, is also a linear function of the surface area of the switch. The calculation of this function, and the calculation of required switching power and switching speed as a function of trench etch penetration into the substrate, are explained below with reference to the alternative switch embodiment of the present invention shown in FIG. 4.

Figure 4:
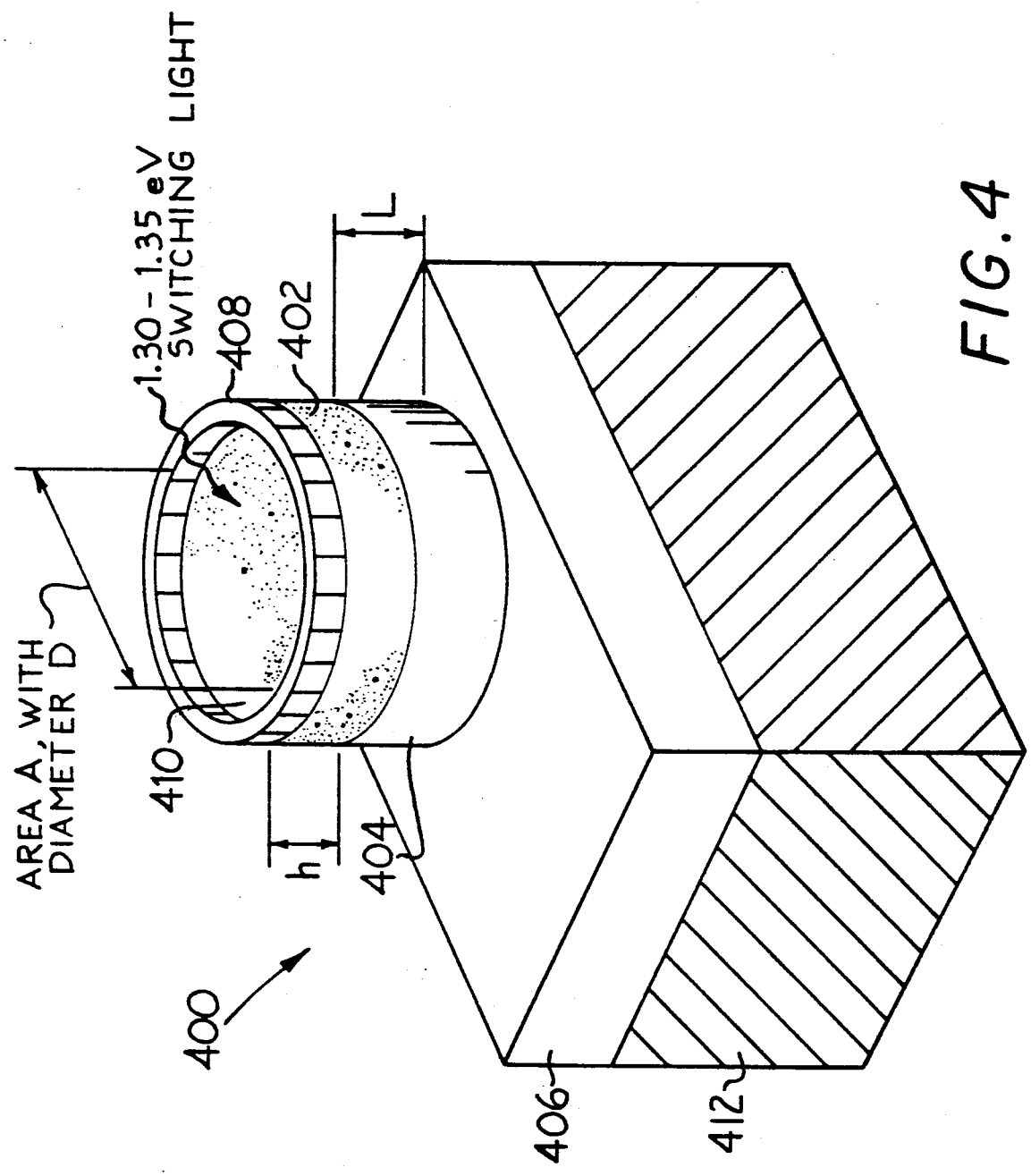
FIG. 4 is a perspective view diagram of an alternative embodiment of an optical switching device in accordance with the principles of the invention.

FIG. 4 shows a switch 400 comprising a cylindrical InGaAs active switching layer 402 grown on top of a cylindrical GaAs pedestal 404, which in turn is grown on the surface of a low doped GaAs substrate 406. Top metal contact 408 forms a thin circular ring at the upper edge of switching layer 402, leaving a light receiving surface 410 of area A with diameter D. Switching layer 402 has a height represented by h. Pedestal 404 has a height represented by L. On the bottom of substrate 406 is a metal contact and heat sink layer 412 having a hole therethrough to pass light from switch 400. For purposes of applying the following calculations to switch embodiment 100, the height L of pedestal 404 can be equated with the penetration depth of trench etch 124.

Assuming that the heat sinking capability of metal layer 412 maintains the temperature of substrate 406 constant, to develop a temperature rise (ΔT) of 126° C. in switching layer 402, a temperature gradient of 126° C. must exist along the height L of pedestal 404. The power required to maintain this temperature gradient is given by the equation $P_{IN} = KA/L \times \Delta T$, where K(GaAs) is the thermal conductivity of GaAs and is equal to 0.46 W/cm-° C. The total energy ($\Delta Q$) required to heat the switch in a time interval ($\Delta t$) is thus given by the equation $$\Delta Q = \rho S_H h A \Delta T = P_{IN} \Delta t - [KA/L \times \Delta T \Delta t],$$

where $\rho$(GaAs) is the mass density of GaAs and equal to 5.32 g/cm$^3$, and $S_H$(GaAs) the specific heat of GaAs and is equal to 0.35 Joule/g-° C.

Differentiating this equation over time gives $$\rho S_H h A \, d\Delta T/dt + [KA/L \times \Delta T] = P_{IN}$$

and solving for $P_{IN}=0$ provides $$\Delta T = \Delta T_0 e^{-t/\tau} + P_{IN} L/KA + C,$$

where $\tau = \rho S_H h L/K = 4.05$ sec/cm$_2 \times$ hL and C is a constant. Assuming a height h=3 $\mu$m, this gives $\tau = 1.22 \, (10^{-3})$ sec/cm$\times$L. Allowing $\tau$ to define the time required to switch between off and on states, the following table of values can be calculated:

TABLE 1

| L($\mu$m) | $\tau$(sec) | $P_{IN}$(W) (D = 100 $\mu$m) | $P_{IN}$(W) (D = 10 $\mu$m) |
|---|---|---|---|
| 0.1 | 1.22(10$^{-8}$) | 455 | 4.55 |
| 1.0 | 1.22(10$^{-7}$) | 45.5 | 0.455 |
| 10 | 1.22(10$^{-6}$) | 4.55 | 0.0455 |
| 10$^2$ | 1.22(10$^{-5}$) | 0.455 | 4.55(10$^{-3}$) |
| 10$^3$ | 1.22(10$^{-4}$) | 0.0455 | 4.55(10$^{-4}$) |

Figure 5:
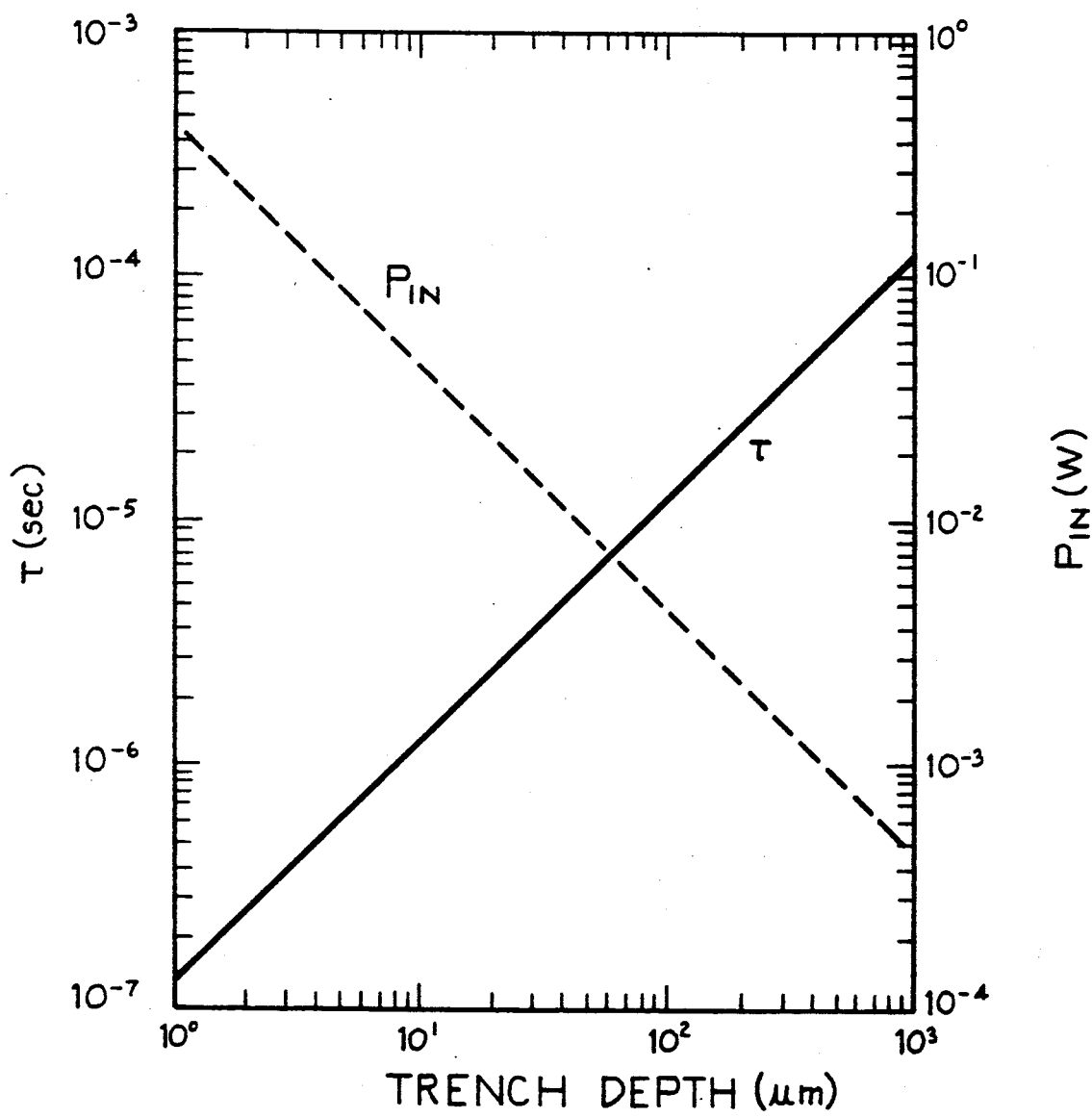
FIG. 5 is a graph showing how switch response time and switching input power for an embodiment of the optical switch of the present invention are expected to vary with changes in trench depth penetration into the substrate.

As shown by Table 1, for a 10 $\mu$m trench etch penetration or pedestal height, the calculated switching speed is 1.2 microseconds. For a 10 $\mu$m diameter area, which can accommodate a single mode optical fiber, and a 1.2 microsecond switching time, the calculated switching power requirement is 45 mW per device. The opposite variation of switching speed and required switching power as a function of trench depth is plotted in FIG. 5 (for $\Delta T = 126°$ C., h=2.25 $\mu$m and an area A corresponding to that of a 10 $\mu$m diameter; values of mass density, specific heat and thermal conductivity are the same as defined above).

Since the switching mechanism of the present invention is thermal, the switching devices do not require a pn junction. Therefore, layers 104, 106, 108, 110 and 112 of switch 100 of FIG. 1 can be replaced by a semiconductor resistor material of just p-type or n-type. Likewise, switching layer 402 of switch 400 may also comprise a layer of single polarity type semiconductor material. To obtain the same 11.2W of heating in such a layer of InGaAs material (e.g., for the same 3.2V electrical switching signal), the resistance value should be $$R = V^2/P = (3.2V)^2/11.2W = 0.914 \text{ ohms.}$$

For a 3 $\mu$m thick InGaAs layer with a cross-sectional area of (0.6 cm)$^2$=0.36 cm$^2$, this would specify a resistivity of $$r = RA/h = 1.10(10^3) \text{ ohm-cm.}$$

For a mobility $\mu = 1,000$ cm$^2$/V-sec, this corresponds to a carrier concentration of N=5.70 (10$^{18}$) cm$^{-3}$, thus defining the composition of the semiconductor material to be used.

Fabricating a switch using a single polarity resistor layer has the advantage that no minority carriers are injected across a pn junction that could generate light noise (laser amplifier noise) to interfere with the optical signal being switched.

Applicants contemplate that the principles of the present invention may be used in switching devices of various other types. For example, the switch may comprise a low doped indium phosphide substrate and a gallium indium arsenide phosphide active switching layer.

Alternatively, the active layer of the switch may comprise a multiple quantum well structure. The MQW structure has very strong exciton resonances which provide relatively narrow absorption peaks at different light wavelengths. These absorption peaks shift with changes in temperature. As is well known, the absorption peaks can be created, for example, by including aluminum in thin layers of GaAs material sandwiched alternately with other thin layers of GaAs that do not include aluminum. Depending on the relationship between the wavelength of the switched light and the peak absorption wavelengths of the MQW structure, the switch may be designed to be either normally on or normally off (e.g., at room temperature). In other words, if a normally off switch is desired, the MQW structure is fabricated such that (or the wavelength of the light signal to be switched is chosen such that), at room temperature, the wavelength of the light signal is in the middle of an absorption peak of the MQW structure. By heating the MQW structure, either with an optical or electrical signal as previously described, the absorption peak is shifted away from the wavelength of the light signal to turn the switch on. On the other hand, if a normally on switch is desired, the MQW structure is fabricated such that (or light signal wavelength is chosen such that) at room temperature the light signal wavelength will be away from an absorption peak in the MQW structure and, at an elevated temperature achievable by heating the structure, the absorption peak shifts to include the light signal wavelength.

Also, although the switch embodiments described and shown herein are of the type in which the light signal enters one side of the device and exits an opposite side, the present invention may be used in a switch device in which the light signal enters and exits the switch device on the same side (i.e., the light is reflected internally—possibly many times—in the switch device).

Thus it is seen that this invention provides various embodiments of an optical switching apparatus and method having several advantages over the prior art. One skilled in the art will appreciate that the present invention can be practiced by other than the described embodiments, which are presented for purposes of illustration and not of limitation, and the present invention is limited only by the claims which follow.

What is claimed is:

1. An apparatus for controlling the transmission of a light signal of a selected wavelength therethrough, the apparatus comprising:

an active semiconductor region having a temperature-dependent band gap energy, the band gap energy of the active semiconductor region at a first temperature value being greater than the photon energy of the selected wavelength, and at a second temperature value being equal to or lesser than the photon energy of the selected wavelength;

means for receiving a light signal of the selected wavelength into at least a portion of the active semiconductor region; and means for controlling the temperature of the active semiconductor region, the temperature controlling means including means for receiving a control signal to heat the active semiconductor region, whereby:

in the absence of the control signal the temperature of the active semiconductor region is caused to be at the first temperature value and a portion of the light signal received by the active semiconductor region is emitted from the active semiconductor region, and receiving the control signal the temperature of the active semiconductor region is caused to switch to the second temperature value for at least as long as the control signal is received to decrease the portion of the light signal emitted from the active semiconductor region.

2. The apparatus of claim 1, wherein the control signal comprises a second light signal which is sufficiently absorbed by the active semiconductor region to heat at least a portion of the active semiconductor region to the second temperature value.

3. The apparatus of claim 1, wherein the control signal comprises a voltage differential applied to the apparatus for causing an electrical current to be generated in the active semiconductor region sufficient to heat at least a portion of the active semiconductor region to the second temperature value.

4. The apparatus of claim 1, wherein the active semiconductor region comprises a plurality of semiconductor layers, at least two of the semiconductor layers forming a pn junction therebetween.

5. The apparatus of claim 1, wherein the active semiconductor region comprises semiconductor material of a single polarity.

6. The apparatus of claim 1, further comprising a semiconductor substrate that is low doped to be transparent below its band gap energy and has a band gap energy that is higher than that of the active semiconductor region that performs switching.

7. A semiconductor device for switching a light signal of a selected wavelength, comprising:

a semiconductor substrate;

an active switching region of semiconductor material formed on the substrate and having a band gap edge at room temperature at a wavelength shorter than the selected wavelength;

a layer of semiconductor material formed between the active region and the substrate to accommodate lattice mismatch;

a surface formed on the active switching region for receiving the light signal;

and means for receiving a control signal to selectively raise the temperature of the active switching region above room temperature so as to cause the band gap edge of the active semiconductor region to switch to a wavelength longer than the selected wavelength, whereby the device is switched from an on state to an off state.

8. The device of claim 7, wherein the means for receiving a control signal comprises a surface for receiving a second light signal that is absorbed by the active switching region.

9. The device of claim 8, wherein the second light signal is received at the same surface as the light signal of the selected wavelength.

10. The device of claim 7, wherein the means for receiving a control signal comprises first and second metallization layers formed on opposite sides of the device in a manner such that the active switching region can be sufficiently heated to cause switching by creating a voltage differential between the two metallization layers.

11. The device of claim 7, wherein the surface for receiving the light signal comprises an antireflective coating.

12. The device of claim 7, further comprising an antireflective coating on a surface of the substrate for emitting the light signal from the device.

13. The device of claim 12 wherein the substrate comprises low doped indium phosphide and the active switching region comprises gallium indium arsenide phosphide.

14. The device of claim 7, wherein the substrate comprises gallium arsenide and the active switching region comprises gallium indium arsenide.

15. An optical cross bar switch comprising:

a substrate of semiconductor material;

switching means including a plurality of individual thermally activated switching devices for selectively switching light signals, the devices being formed in a parallel matrix on the substrate and each device comprising an active semiconductor switching region in which switching is activated by applying a control signal to the device to change the temperature of the active semiconductor switching region, whereby the thermally activated switching of a light signal can be controlled without requiring variation of a property of the light signal to activate switching; and a light receiving surface formed on each switching device.

16. The cross bar switch of claim 15, further comprising:

a metal contact region formed on each switching device for providing electrical contact to the active semiconductor switching region of the device; and a metal grid formed on the substrate opposite from the switching devices, the metal grid having a separate light transmissive opening associated with each of the plurality of switching devices.

17. The cross bar switch of claim 15, wherein the active semiconductor switching region of each switching device comprises a semiconductor material selected to switch a nonpolarized light signal of a selected wavelength.

18. The cross bar switch of claim 17, wherein the active semiconductor switching region comprises a multiple quantum well structure.

19. The optical cross bar switch of claim 15, wherein the switching means includes means for providing a controllable degree of thermal isolation between active semiconductor switching regions, whereby switching speed and thermal power required to activate switching in the individual switching devices can be selectively balanced.

20. The optical cross bar switch of claim 19, wherein the thermal isolation means comprises a trench separating the active semiconductor switching region of an individual switching device from the active switching regions of other individual switching devices in the parallel matrix.

21. The optical cross bar switch of claim 20, wherein the trench comprises a trench etch extending into the substrate.

22. A method for switching a light signal of a selected wavelength, comprising the steps of:
- transmitting the light signal into a switching medium having a thermally sensitive coefficent of optical absorption at the selected wavelength;
- disposing the switching medium such that at least a portion of the light signal transmitted into the switching medium exits the switching medium and is received by a light receiving device; and
- controlling the temperature of the switching medium by selectively applying a second signal to the switching medium, the application of the second signal to the switching medium causing an increase in the temperature of at least a portion of the medium into which the light signal is transmitted whereby the second signal causes the switching medium to switch from an on state to an off state and the portion of the light signal exiting the switching medium is decreased.

23. A method for switching a light signal of a selected wavelength, comprising the steps of:
- transmitting the light signal into a switching medium having a thermally sensitive coefficent of optical absorption at the selected wavelength;
- disposing the switching medium such that at least a portion of the light signal transmitted into the switching medium exits the switching medium and is received by a light receiving device; and
- controlling the temperature of the switching medium by selectively applying a second signal to the switching medium, the application of the second signal to the switching medium causing an increase in the temperature of at least a portion of the medium into which the light signal is transmitted whereby the second signal causes the switching medium to switch from an off state to an on state and the portion of the light signal exiting the switching medium is increased.

* * * * *